United States Patent
Persson

(10) Patent No.: US 6,872,067 B2
(45) Date of Patent: Mar. 29, 2005

(54) MOULD TEMPERING

(75) Inventor: Lars Persson, Kristianstad (SE)

(73) Assignee: Nolato AB, Torekov (SE)

( * ) Notice: Subject to any disclaimer, the term of this patent is extended or adjusted under 35 U.S.C. 154(b) by 0 days.

(21) Appl. No.: 10/036,380

(22) Filed: Jan. 7, 2002

(65) Prior Publication Data

US 2003/0068400 A1 Apr. 10, 2003

(30) Foreign Application Priority Data

Oct. 10, 2001 (SE) .............................................. 0103381

(51) Int. Cl.$^7$ .............................................. B29C 45/73
(52) U.S. Cl. ..................... 425/547; 164/348; 249/79; 264/328.14
(58) Field of Search ............................. 249/79, 80, 81; 264/328.14; 164/126, 128, 348; 425/547, 548, 552

(56) References Cited

U.S. PATENT DOCUMENTS

| | | | |
|---|---|---|---|
| 4,642,043 A | | 2/1987 | Schwarzkopf |
| 5,207,266 A | * | 5/1993 | Nakashima et al. ........ 164/348 |
| 5,783,233 A | * | 7/1998 | Takahashi ................... 425/547 |
| 2001/0026817 A1 | * | 10/2001 | Shida et al. ................. 425/547 |

FOREIGN PATENT DOCUMENTS

| DE | 44 08 707 | 9/1995 |
|---|---|---|
| JP | 61217225 | 9/1986 |
| JP | 63040688 | 2/1988 |
| JP | 9155870 | 6/1997 |

OTHER PUBLICATIONS

Merriam–Webster's Collegiate Dictionary 10$^{th}$ Edition, 1996, p. 59.*

* cited by examiner

Primary Examiner—Tim Heitbrink
(74) Attorney, Agent, or Firm—Burns, Doane, Swecker & Mathis, LLP

(57) ABSTRACT

The invention relates to an injection mould (1) for producing three-dimensional components. The mould has a system (2) for mould tempering having at least one groove (12) which is arbitrarily extended between two points in the available volume of the mould for conducting a tempering medium which is intended for tempering of modules (4, 8) included in the mould (1). Each groove (12) is along essentially its entire extent covered by a cover (15). The invention also concerns such a system (2) for mould tempering of injection moulds (1), as well as an injection moulding assembly comprising such an injection mould (1).

22 Claims, 1 Drawing Sheet

MOULD TEMPERING

FIELD OF THE INVENTION

The present invention relates to an injection mould comprising a system for mould tempering, said mould being intended for production of three-dimensional components.

BACKGROUND ART

Injection moulds are used for production of components by injecting under pressure a melt of e.g. plastic into a cavity defined by mould halves. The temperature of the melt depends on the material involved and is transferred to the mould. This heat must be removed for the injection moulded component to obtain a temperature that allows it to be ejected from the mould and handled without dimensional changes. By the production rate being as a rule very high, it is desirable to achieve rapid tempering.

However, mould tempering must take place with great accuracy since plastic shrinks while cooling. If tempering takes place irregularly over the component, dimensional changes in the form of e.g. warping may occur. Warping may be very difficult to predict when components of an essentially three-dimensional extent are involved, i.e. components having an extent other than substantially plane. Irregular tempering may also result in unsatisfactory finish, which is devastating in connection with certain consumer products, such as casings for mobile phones. Therefore the mould designer must, when designing the system for mould tempering, take the geometry and wall thickness of the component into consideration since thicker sections may require additional tempering.

Injection moulds tend to be more and more complex, which in turn increases the problems in connection with mould tempering. Except for the cases where very simple components are involved, such as essentially two-dimensional, mould tempering is always a matter of compromising. The larger and more complex the component the larger amount of material to be tempered. Moreover, complex components require in most cases also a large number of ejectors and slider mechanisms, which all require space in the mould half.

Injection moulds comprise in their simplest embodiment two mould halves which jointly define a cavity. At least one mould half usually comprises a number of ejectors which are arranged in through channels. Moreover, one or more movable sliders are often involved which are also accommodated in the mould half. Thus the mould half is penetrated by a number of channels and recesses. Of course, mould tempering should take place as close as possible to the cavity, which traditionally is solved by drilling a number of through channels in the mould half. Then the openings of the channels are plugged up in such manner that the channels jointly form a network with two open ends. This network can then be connected to a system for circulation, for instance, of a coolant. When a component of three-dimensional extent is involved, such channels must be arranged in several planes in the mould half. This technique is difficult and often causes unsatisfactory mould tempering since it is very complicated or even impossible to vary the geometry of the channels in order to adjust the geometry to the specific need for tempering of different sections of the component. Consequently mould tempering cannot be made optimal. It is also a time-consuming job for the mould maker to drill and plug the mould. There is thus a great need for simple and easy mould tempering for injection moulds for producing components of a substantially three-dimensional extent.

OBJECTS OF THE INVENTION

An object of the present invention is to provide a system for mould tempering of injection moulds for producing components having a substantially three-dimensional extent.

Another object of the invention is that it should be possible to adjust the mould tempering directly to the geometry of the component without taking the other built-in functions of the injection mould into consideration, or taking them into consideration but to a small extent.

One more object of the invention is that it should be possible to easily modify the mould tempering when necessary, also after making the mould.

SUMMARY OF THE INVENTION

According to an aspect of the invention, an injection mould is provided for producing three-dimensional components. The mould is characterised by a system for mould tempering having at least one groove which is arbitrarily extended between two points in the available volume of the mould for conducting a tempering medium which is intended for tempering of modules included in the mould, each groove being covered along essentially its entire extent by a cover.

By arranging a groove having an arbitrary extent through the available volume of the mould, i.e. that part of the mould which is not penetrated by, for instance, channels for ejectors, it will be possible to adjust the groove to the geometry of the cavity and a component formed therein. This is most advantageous when forming components of a three-dimensional extent since they often have a high degree of complexity with, for instance, a varying wall thickness. The term groove relates throughout the description to a groove which is adapted to conduct and hold a medium for tempering, such as water or oil.

An arbitrary extent of the groove allows the groove to be arranged round integrated functions in the mould, such as ejectors, hot-runner systems and sliders. The system for mould tempering can thus be said to be almost independent of the complexity of the mould.

The injection mould is divided into different modules which can each comprise a system for mould tempering. This means that different modules of the mould can be given a separate mould tempering.

By the system for mould tempering being adjusted to the specific tempering needs of the component, an improved finish is achieved, which is most important in the production of components with high surface requirements.

The groove is covered by a cover, thereby forming a covered channel with an inlet and an outlet.

Thus the invention makes it possible to adjust in a new and simple manner the mould tempering to the unique needs of the component, which improves the possibilities of checking and counteracting shrinkage-related dimensional changes of the component.

According to a preferred embodiment, the groove has along its extent a varying width and depth. Thus the width and the depth can be adjusted to the component's specific need for tempering, which is most advantageous in the production of components having a three-dimensional extent.

According to one more preferred embodiment, a seal is arranged between two modules which between them define said groove. It is also preferred for a first module to form a cover for a second module, and for at least one module to constitute a mould half with a cavity formed therein.

In another preferred embodiment, the groove is arranged in connection with a hot-runner system arranged in the injection mould. The system for mould tempering can thus be adjusted to existing temperature zones in the mould and the specific needs of removing this heat.

It is also preferred for the system for mould tempering to be directly or indirectly connected to a circulation system included in an injection moulding assembly.

According to another aspect, the invention comprises a system for mould tempering of injection moulds for producing three-dimensional components. The system is characterised by at least one groove which is arbitrarily extended between two points in the available volume of the mould for conducting a tempering medium which is intended for tempering of modules included in the mould, each groove being covered along essentially its entire length by means of a cover.

According to yet another aspect, the invention comprises an injection moulding assembly which has an injection mould having one of the features defined above.

DESCRIPTION OF DRAWINGS

The invention will now be described in more detail by way of example and with reference to the accompanying drawings which illustrate a currently preferred embodiment.

TECHNICAL DESCRIPTION

Mould tempering relates, throughout the description, to tempering the mould or modules thereof to a desired temperature. Cooling as well as heating may thus be involved. The injection mould and its system for mould tempering is preferably intended for production of components of a three-dimensional extent. In the following description, the terms "front side" and "rear side" will be used. By "front side" of the mould is meant that part of the mould half which faces the cavity. Correspondingly, the "rear side" of the mould relates to that part of the mould half which faces away from the cavity.

Figure 1:
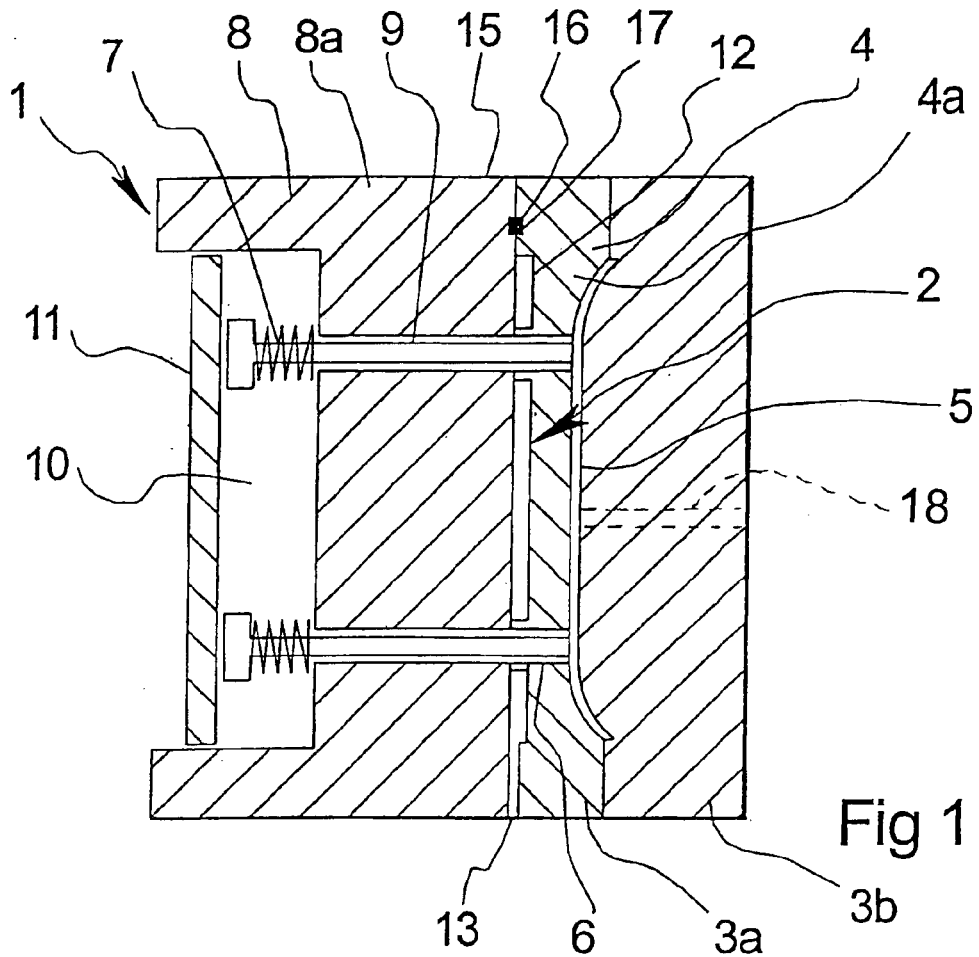
FIG. 1 is a schematic cross-sectional view of an injection mould comprising a system for mould tempering according to the present invention.

FIG. 1 is a schematic side view of an injection mould 1 comprising a system 2 for mould tempering according to the present invention. The injection mould 1 comprises two mould halves 3a, 3b which jointly define a cavity 5.

In contrast to traditional injection moulds, the injection mould 1 comprises a number of modules 4, 8. Such a division is necessary to render the invention possible. Examples of such modules are a mould module 4a and an ejector module 8a. It will be appreciated that the modules 4, 8 can be designed in various ways and contain different functions, but that this is less important to the invention.

In its simplest embodiment, the mould module 4a comprises a cavity 5 and a number of through channels 6 to be passed by ejectors 7 in order to allow ejection of a component formed in the cavity. The mould module 4a can also, depending on the complexity of the component, comprise a number of recesses for holding slider mechanisms (not shown).

The ejector module 8a comprises an ejector assembly having a number of through channels 9 for holding ejectors 7 and a recess 10 arranged on the rear side and adapted to accommodate a pressure plate 11. The channels 9 in the ejector module 8a are concentrically arranged relative to the channels 6 in the mould module 4a. It will be appreciated that the ejector assembly may be designed in many different ways, and that its design is of no import to the function of the invention.

For optimum mould tempering, the system 2 should be arranged as close as possible to the area that is to be tempered, i.e. in the simplest case the cavity 5. Thus the system 2 is arranged in the rear side of the mould module 4a in the wall portion behind the cavity 5.

Figure 2:
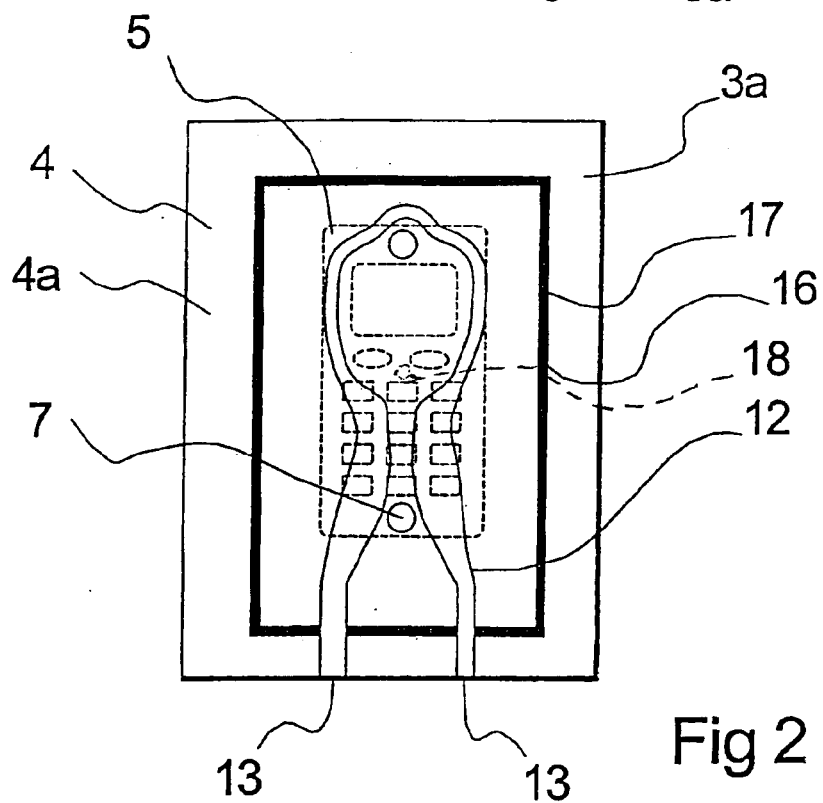
FIG. 2 is a schematic top plan view of a module of an injection mould comprising a system for mould tempering according to the invention.

With reference to FIGS. 1 and 2, the system 2 for mould tempering comprises a groove 12, which is below referred to as cooling groove. The cooling groove 12 comprises a milled groove of an arbitrary length, depth and extent. The cooling groove 12 is formed in the available volume of the mould, i.e. that part of the mould which is not penetrated by, for example, channels and recesses for ejectors and sliders. In the areas of the cavity 5 that require extra tempering, the cooling groove 12 can thus be made locally wider or deeper. Correspondingly, the cooling groove 12 can be made narrower or shallower where the need for tempering is smaller.

The cooling groove 12 has at least two openings 13 which form the inlet and the outlet respectively. These are positioned and designed in such manner that they can be connected in a simple manner (not shown) to a circulation system arranged in an injection moulding assembly The circulation system is of a conventional kind and circulates, for example, a coolant in the form of water or oil.

The extent of the cooling groove 12 can be fully adjusted to the equipment which is arranged in the mould half 3 and its cavity 5, for instance channels 6 for ejectors 7 or recesses (not shown) for slider mechanisms. Thus the cooling groove 12 can meander between channels 6 and recesses. The cooling groove 12 requires no specific cross-section or surface quality.

The cooling groove 12 is covered by a cover 15 which in its simplest embodiment constitutes the module directly adjoining the mould module 4a, i.e. the ejector module 8a according to the case shown in FIG. 1. To prevent a coolant circulating in the cooling groove from escaping between the modules 4a, 8a, a seal 16 is preferably arranged in a seal-holding groove 17 in one of the modules 4a, 8a.

Such a cooling system 12 can also be arranged in other positions in the injection mould 1, for instance in connection with a hot-runner 18 system. The principle is the same as described above, viz, that the cooling groove is preferably arranged as close as possible to the area in the mould that is to be tempered and is covered by a cover plate which preferably consists of an adjoining module in the mould. The cover plate can also consist of a separate cover plate without any other function.

Summing up, the invention provides a system 2 for mould tempering of injection moulds 1 which is intended for production of components of a substantially three-dimensional extent. The mould tempering can be adjusted to a very high degree to the component's specific needs for tempering by, for example, varying width, depth and distance to the cavity 5 along the extent of the groove 12. The system 2 for mould tempering can be arranged in separate modules 4, 8 in the injection mould 1, for instance in connection with the hot-runner system and the cavity respectively. Adjoining modules 4, 8 form covers 15 over the groove 12. A system 2 for mould tempering according to the invention is easy to manufacture, and little attention need be paid to integrated functions in the injection mould 1, such as sprues, slider mechanisms and ejectors.

By the mould tempering being adjustable to the geometry and wall thickness of the three-dimensional component, a significantly enhanced possibility of counteracting, by tempering according to needs, warpage of the components will be achieved. The mould tempering according to needs also makes it possible to obtain an improved finish of the components produced.

One more advantage that is achieved by the invention is that tempering proceeds more quickly, which results in a higher capacity.

Thus the invention brings such advantages that it can be used in the production of components with high demands on dimensional accuracy and finish and involving large volumes. Examples of such components are casings for mobile phones and other high status consumer products.

It will be appreciated that the present invention is not limited to the shown embodiment of the inventive system for mould tempering of injection moulds. Several modifications and variants are thus feasible, and the invention is consequently defined exclusively by the appended claims.

What is claimed is:

1. An injection mould for producing three-dimensional components, comprising:

a system for mould tempering having at least one groove which is arbitrarily extended that extends between two points in an available volume of the mould for around a cavity, the groove conducting a tempering medium which is intended for tempering of modules included in the mould, the groove extending between the two points along a path having a shape designed according to a shape of the cavity and according to locations of one or more components for performing integrated functions in order to increase and decrease a rate of heat transfer from the mould to the tempering medium at different positions along the length of the groove, each groove being covered along essentially its entire extent by a cover.

2. An injection mould as claimed in claim 1, in which the groove along its extent is of a varying width and depth.

3. An injection mould as claimed in claim 1, in which a seal is arranged between two modules which between them define said groove.

4. An injection mould as claimed claim 1, in which a first module forms a cover for a second module.

5. An injection mould as claimed in an claim 1, in which at least one module constitutes a mould half with a cavity formed therein.

6. An injection mould as claimed in claim 1, in which the groove is arranged in connection with a hot-runner system arranged in the injection mould.

7. An injection mould as claimed claim 1, in which the system for mould tempering is directly or indirectly connected to a circulation system included in an injection moulding assembly.

8. A system for mould tempering of injection moulds for producing three-dimensional components, comprising at least one groove which is arbitrarily extended that extends between two points in an available volume of the mould for conducting a tempering medium which is intended for tempering of modules included in the mould, the groove extending between the two points along a path having a shape designed according to a shape of a mould cavity and according to locations of one or more components for performing integrated functions in order to increase and decrease a rate of heat transfer from the mould to the tempering medium at different positions along the length of the groove, each groove being covered along essentially its entire length by a cover.

9. An injection moulding assembly comprising an injection mould as claimed in claim 1.

10. An injection mould as claimed in claim 2, in which a seal is arranged between two modules which between them define said groove.

11. An injection mould as claimed claim 2, in which a first module forms a cover for a second module.

12. An injection mould as claimed claim 3, in which a first module forms a cover for a second module.

13. An injection mould as claimed in an claim 2, in which at least one module constitutes a mould half with a cavity formed therein.

14. An injection mould as claimed in an claim 3, in which at least one module constitutes a mould half with a cavity formed therein.

15. An injection mould as claimed in claim 2, in which the groove is arranged in connection with a hot-runner system arranged in the injection mould.

16. An injection mould as claimed in claim 3, in which the groove is arranged in connection with a hot-runner system arranged in the injection mould.

17. An injection mould as claimed claim 2, in which the system for mould tempering is directly or indirectly connected to a circulation system included in an injection moulding assembly.

18. An injection mould as claimed claim 3, in which the system for mould tempering is directly or indirectly connected to a circulation system included in an injection moulding assembly.

19. An injection moulding assembly comprising an injection mould as claimed in claim 2.

20. An injection moulding assembly comprising an injection mould as claimed in claim 3.

21. An injection mould as claimed in claim 1, wherein the increase and decrease of the rate of heat transfer varies according to tempering needs of specific areas of the modules.

22. A system for mould tempering according to claim 8, wherein the increase and decrease of the rate of heat transfer varies according to tempering needs of specific areas of the modules.

* * * * *